(12) United States Patent
Gupta et al.

(10) Patent No.: US 9,489,320 B2
(45) Date of Patent: Nov. 8, 2016

(54) SYSTEM AND METHOD FOR TRANSFERRING AN ACTIVE STATE BETWEEN A POWERFUL PROCESSOR AND A LESS POWERFUL PROCESSOR

(71) Applicant: DELL PRODUCTS, LP, Round Rock, TX (US)

(72) Inventors: Chitrak Gupta, Bangalore (IN); Sushma Basavarajaiah, Bangalore (IN)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

(21) Appl. No.: 15/169,267

(22) Filed: May 31, 2016

(65) Prior Publication Data

US 2016/0274985 A1   Sep. 22, 2016

Related U.S. Application Data

(63) Continuation of application No. 14/456,205, filed on Aug. 11, 2014, now Pat. No. 9,372,814.

(51) Int. Cl.
| | |
|---|---|
| G06F 1/16 | (2006.01) |
| G06F 9/44 | (2006.01) |
| G06F 13/12 | (2006.01) |
| G06F 9/48 | (2006.01) |

(52) U.S. Cl.
CPC ........... *G06F 13/126* (2013.01); *G06F 1/1626* (2013.01); *G06F 9/441* (2013.01); *G06F 9/4856* (2013.01)

(58) Field of Classification Search
CPC .... G06F 13/126; G06F 9/441; G06F 9/4403; G06F 1/1632; G06F 1/1626
See application file for complete search history.

(56) References Cited

U.S. PATENT DOCUMENTS

| | | | |
|---|---|---|---|
| 6,549,968 B1 * | 4/2003 | Hart | G06F 9/4401 710/303 |
| 8,484,495 B2 | 7/2013 | Boyd et al. | |
| 8,750,546 B2 | 6/2014 | Meier et al. | |
| 2007/0157041 A1 | 7/2007 | Young | |
| 2012/0159198 A1 | 6/2012 | Naffziger et al. | |

* cited by examiner

*Primary Examiner* — Ernest Unelus
*Assistant Examiner* — Ronald Modo
(74) *Attorney, Agent, or Firm* — Larson Newman, LLP (57) ABSTRACT

An information handling system includes a tablet with a processor, and a dock with a second processor that determines that the tablet is coupled to the dock, boots the dock, receives a request for the tablet to be uncoupled from the dock, creates a migration image with state information of the dock and that identifies a process running on the dock, and sends the migration image to the tablet. The first processor receives the request, boots the tablet, receives the migration image from the second processor, loads the state information to the tablet, and launches the first process.

20 Claims, 6 Drawing Sheets

SYSTEM AND METHOD FOR TRANSFERRING AN ACTIVE STATE BETWEEN A POWERFUL PROCESSOR AND A LESS POWERFUL PROCESSOR

CROSS-REFERENCE TO RELATED APPLICATION(S)

This application is a continuation of U.S. patent application Ser. No. 14/456,205, entitled "System and Method for Transferring an Active State Between a Powerful Processor and a Less Powerful Processor," filed on Aug. 11, 2014, the disclosure of which is hereby expressly incorporated by reference in its entirety.

FIELD OF THE DISCLOSURE

This disclosure relates generally to information handling systems, and more particularly relates to transferring an active state between a powerful processor and a less powerful processor in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. An information handling system can include an embedded controller that provides an interface for the management of resources in the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
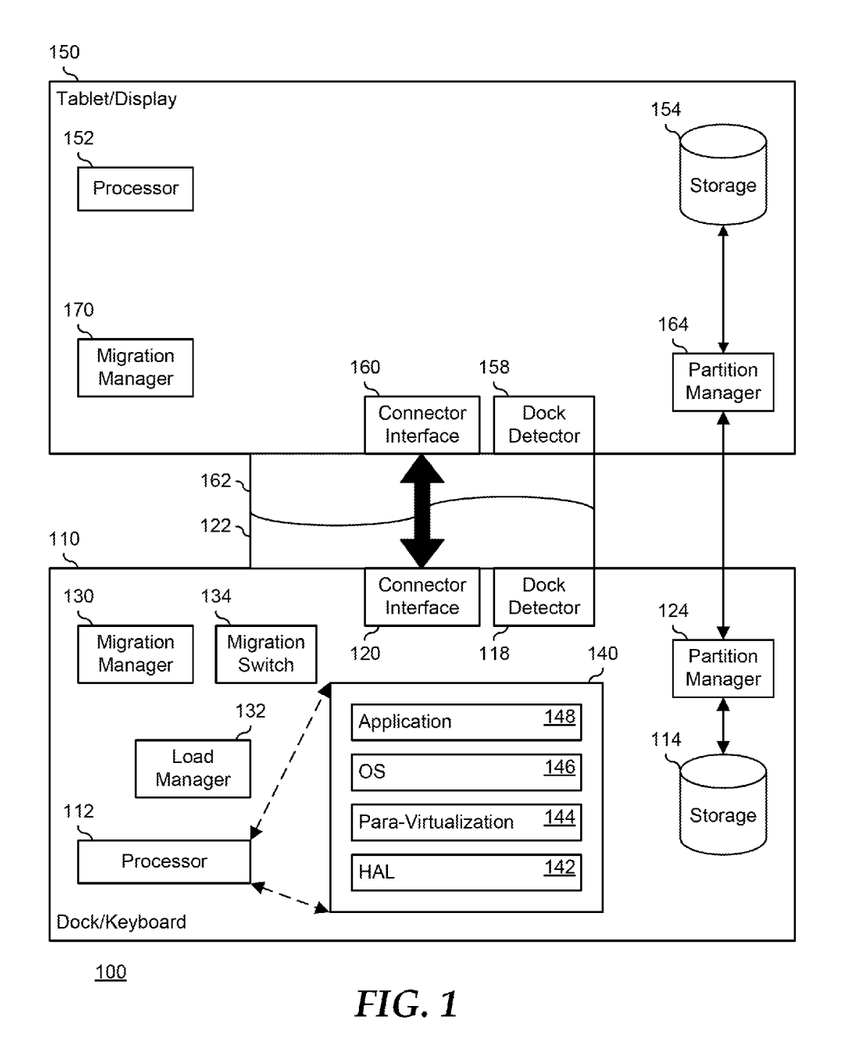
FIG. 1 is a block diagram of a hybrid device according to an embodiment of the present disclosure.

FIG. 1 illustrates a hybrid device 100 that can be implemented as one or more information handling systems. For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display.

Hybrid device 100 includes a dock processing system 110 and a tablet processing system 150. Dock processing system 110 represents a powerful, fully featured information handling system that includes a large data storage capacity, and tablet processing system 150 represents an information handling system that is less powerful and that includes a smaller storage capacity as compared with the dock processing system. However, tablet processing system 150 is a lighter, more portable information handling system that has a compact form factor for use as a stand-alone tablet information handling system. As such, dock processing system 110 can include functions and features associated with a laptop or desktop processing system, such as a large power supply to enable charging of hybrid processing device 150, a keyboard device, a mouse/touchpad device, greater I/O capabilities in the form of various I/O connectors, and other devices, as needed or desired. In terms of operating environment, dock processing system 110 can include a full application stack, such as a desktop or laptop operating system, greater multi-media storage and display capabilities for more graphics intensive applications like game programs or image processing programs, a full application suite, such as an office productivity suite, and the like, as needed or desired. Further, tablet processing device can include functions and features associated with a tablet or pad processing device, such as a touch-screen display device, a WiFi communication device, a pen-based interface device, and other devices, as needed or desired, and can provide a streamlined operating environment, such as a mobile operating system, and mobility-based applications such as mobile device media applications, reduced functionality office productivity applications, and the like.

Hybrid device 100 is configured to operate in several distinct operating modes to provide a user with flexibility in determining how to use the hybrid device. In a docked mode, dock processing system 110 and tablet processing system 150 are connected together, both electrically and physically via their respective connectors 122 and 162. Here, the full functions and features of dock processing system 110 are utilized to provide a rich user experience, while using tablet processing system 150 primarily as the display device for hybrid device 100. In a particular embodiment, some functions and features of tablet processing device 150 are utilized when hybrid device 100 is in the docked mode, such as the touch-screen device or pen-based device features, the storage capacity of the tablet processing device, or other functions or features. In a tablet mode, dock processing system 110 and tablet processing system 150 are separated from each other physically and electrically. Here, dock processing system 110 is shut off or otherwise disabled and the functions and features of tablet processing system 150 are utilized to provide a mobile user experience. In a particular embodiment, tablet processing system 150 maintains a data connection to dock processing system 100 when in the tablet mode, via, for example, a WiFi interface, as needed or desired. FIG. 1 illustrates hybrid device 100 as configured in the docked mode.

Dock processing system 110 includes a processor 112, a storage device 114, a dock detector 118, a connector interface 120, a connector 122, a partition manager 124, a migration manager 130, and a load manager 132, and a migration switch 134. Processor 112 represents a desktop or laptop CPU. Storage device 114 represents a large capacity data storage device, such as a disk drive, an externally attached storage device such as a network attached storage or a storage area network, or the like. Dock detector 118 operates to provide an indication to dock processing system 110 that it is connected, or docked, to tablet processing system 150. Connector interface 120 represents a high bandwidth data connection that operates to transfer large amounts of data between dock processing system 110 and tablet processing system 150. For example, connector interface 120 can include one or more of a high-speed communication link such as a USB 3.0 interface, a SCSI-Ultra interface, a PCIe interface, a SATA interface, a 1394 (Firewire) interface, a HDMI interface, another high-speed communication link, or a combination thereof. In a particular embodiment, connector interface 120 represents a higher bandwidth for data communication to tablet processing system 150 than for communication from the tablet processing device. For example, connector interface 120 can represent a higher bandwidth media link for transferring multimedia data to tablet device 150, and a lower bandwidth link for other bi-directional data transfers. Connector 122 represents a both a physical attachment mechanism and an electrical attachment mechanism between dock processing system 110 and tablet processing system 150. Partition manager 124 operates to manage data transfers between dock processing system 110 and tablet processing system 150. In a particular embodiment, partition manager 124 is not a separate data interface, but utilizes a portion of the bandwidth of connector interface 120 to transfer non-video data between storage device 114 and a storage device 154 of tablet processing device 150. The operations of migration manager 130, load manager 132, and migration switch 134 will be described below with reference to FIG. 3, below.

Tablet processing system 150 includes a processor 152, a storage device 154, a dock detector 158, a connector interface 160, a connector 162, a migration manager 170, and a partition manager 172. Processor 152 represents a tablet or mobile device CPU. Storage device 154 represents a smaller capacity data storage device, such as a non-volatile RAM (NVRAM). Dock detector 158 operates to provide an indication to tablet processing system 150 that it is docked to dock processing system 110. Connector interface 160 represents the complimentary high bandwidth data connection to connector interface 120. Connector 162 represents the complimentary connector to connector 122. Partition manager 164 operates, in conjunction with partition manager 124, to manage data transfers between dock processing system 110 and tablet processing system 150. The operations of migration manager 170 will be described below with reference to FIG. 3, below.

In the docked mode, shown in FIG. 1, dock processing system 110 instantiates an operating environment 140, including a hardware abstraction layer (HAL) 142, a para-virtualization layer 144, an operating system (OS) 146, and one or more application 148. When hybrid device 100 is booted, a power-on self test (POST) process is initiated that loads HAL 142 and passes machine execution to para-virtualization layer 144. Para-virtualization layer 144 operates similarly to a virtual machine hypervisor, to launch OS 146 which provides a user with an operating environment from which to initiate application 148. In a particular embodiment, HAL 142 and para-virtualization layer 144 reside in a system firmware for dock processing system 110 that is stored in a small, but fast NVRAM that permits a rapid boot of the dock processing system. In a particular embodiment, para-virtualization layer 144 operates to manage the launch of one or more additional OS, in which case, dock processing system 110 can be said to include one or more additional operating environments associated with each additional OS. Other functions and features of para-virtualization layer 144 will be described below with reference to FIG. 3, below.

Figure 2:
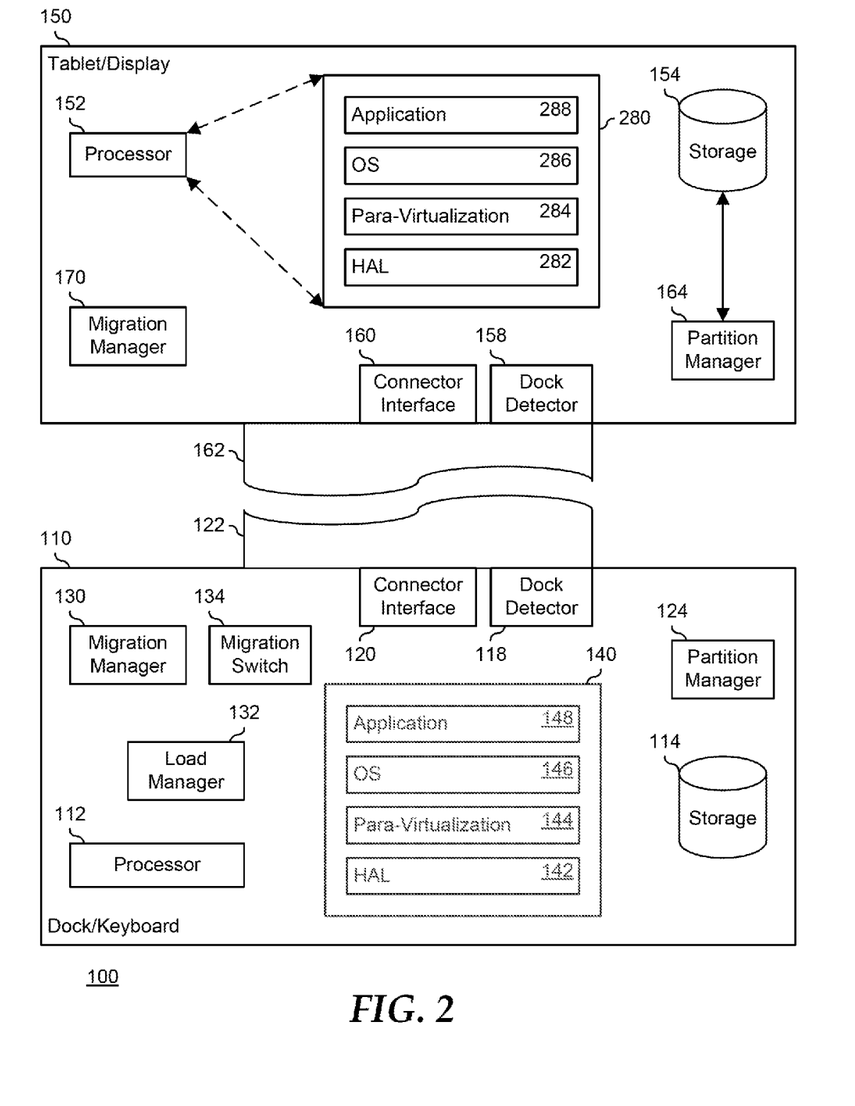
FIG. 2 is a block diagram illustrating a forced undock mode event on the hybrid device of FIG. 1.

FIG. 2 illustrates hybrid device 100 in a first tablet mode, called the forced undock mode. Here, tablet processing system 150 is disconnected from dock processing system 110, the dock processing system is shut-down or otherwise placed into a low-power state, operating environment 140 is suspended or otherwise shut-down and an operating environment 280 is instantiated on tablet processing device 150. An example of suspending operating environment 140 includes performing a hibernation operation, a suspend-to-RAM operation, a suspend-to-disk operation, a suspend-to-network operation, another suspend operation, or a combination thereof. Here, in a particular embodiment, a user can have disconnected tablet processing system 150 from dock processing system 110 by separating the processing system, such as where connectors 122 and 162 are physically connected via a magnetic attachment mechanism. In another embodiment, the user can have disconnected tablet processing system 150 from dock processing system 110 by uncoupling a latch mechanism. In either of the above embodiments, dock detector 118 detects the forced undock, and initiates a shut-down operation in dock processing system 110 to suspend operating environment 140 and to shut-down the dock processing system. In a third embodiment, a user interface can provide an option for performing a force undock without having physically disconnected tablet processing system 150 from dock processing system 110. Here, one or more of the elements of operating environment 140 operates to detect that a user has engaged the user interface option, and initiates the shut-down operation.

Further, when hybrid device 100 is placed into the forced undock mode, tablet processing system 150 instantiates operating environment 280, including a HAL 282, a para-virtualization layer 284, an OS 286, and one or more application 288. When hybrid device 100 is placed into the forced undock mode, a POST process is initiated that loads HAL 282 and passes machine execution to para-virtualization layer 284. Para-virtualization layer 284 operates similarly to a virtual machine hypervisor, to launch OS 286 which provides the user with an operating environment from which to initiate application 288. In a particular embodiment, HAL 282 and para-virtualization layer 284 reside in a system firmware for tablet processing system 150 that is stored in a small, but fast NVRAM that permits a rapid boot of the tablet processing system. Other functions and features of para-virtualization layer 284 will be described below with reference to FIG. 3, below.

Figure 3:
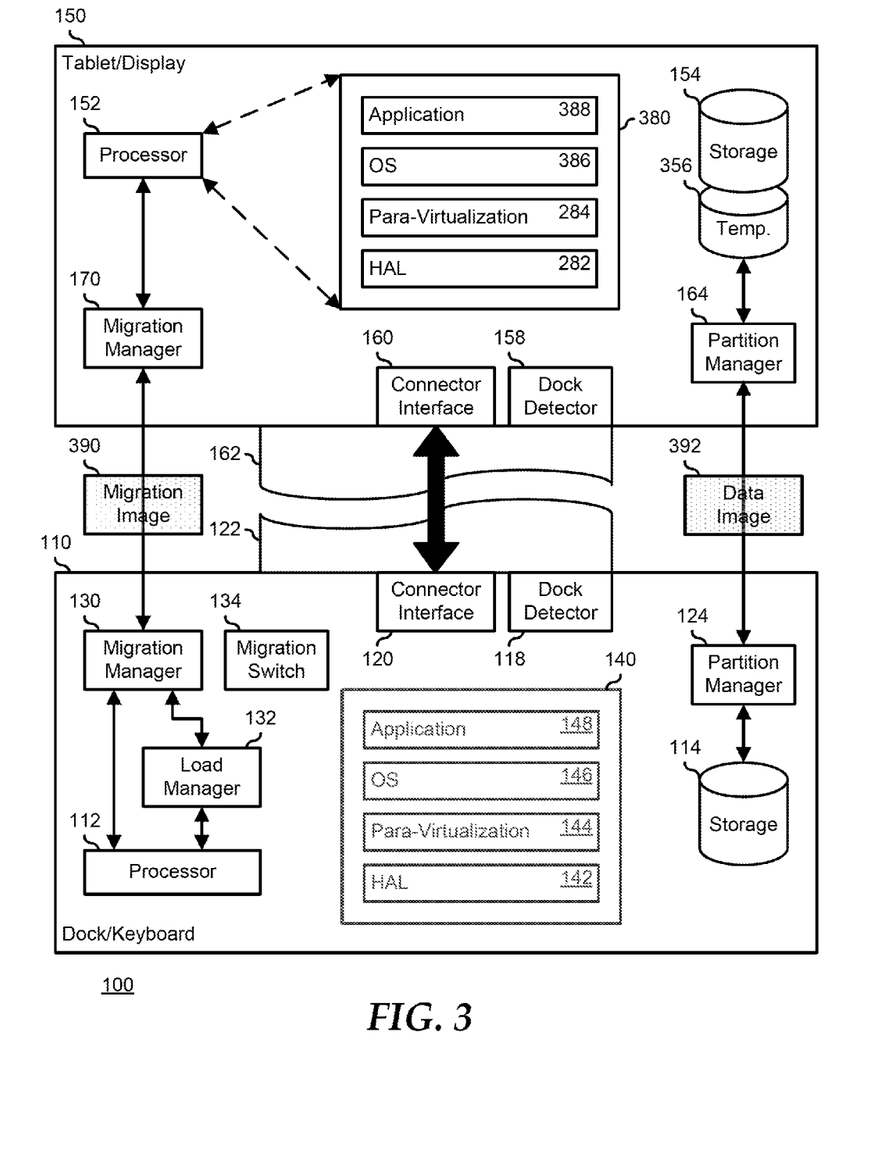
FIG. 3 is a block diagram illustrating a migration undock mode event on the hybrid device of FIG. 1.

FIG. 3 illustrates hybrid device 100 in a second tablet mode, called the migration undock mode. Here, similarly to the forced undock mode, tablet processing system 150 is disconnected from dock processing system 110, the dock processing system is shut-down or otherwise placed into a low-power state, operating environment 140 is suspended or otherwise shut-down, and an operating environment 380 is instantiated on tablet processing device 150, but the methods and steps to get to the migration undock mode differ from the forced undock mode. However, here migration switch 134 is used to request the migration undock mode. In a particular embodiment, migration switch 134 represents a button, a keyboard key or key combination, or another hardware indication that signals for the one or more elements of operating environment 140 to initiate the migration operation. In another embodiment, migration switch 134 represents a user interface that provides an option for selecting the migration undock, and one or more of the elements of operating environment 140 operates to detect that a user has engaged the user interface option, and initiates the migration operation.

When hybrid device 100 is placed into the migration undock mode, tablet processing system 150 instantiates operating environment 380, similar to operating environment 280 and including HAL 282, para-virtualization layer 284, an OS 386 similar to OS 286, and one or more application 388 similar to application 288. A POST process is initiated that loads HAL 282 and passes machine execution to para-virtualization layer 284. Para-virtualization layer 284 operates to launch OS 386 which provides the user with an operating environment and initiates application 388 based upon a migration image 390 and a data image 392 provided by migration manager 130, as described further, below.

Here, prior to shutting down dock processing system 110 and suspending operating environment 140, load manager 132 monitors running processes in operating environment 140 to determine a process footprint for each processes that is running in the operating environment. The process footprints are a quantified value of the amount of resources of dock processing system 110 that each process is utilizing. In particular, load manager 132 tracks statistical information regarding each process. Table 1, below, illustrates an example of processes that are being tracked by load manager 132. Here, each process is tracked by a process name, an average amount of CPU usage each task is utilizing, an average amount of memory usage each task is utilizing, and a resource footprint for each task. An example of a process includes a program or application running on dock operating system 110, a thread of a multi-threaded program or application, a background task such as a print manager, a communication or I/O monitor task, another task, program, or application, or a combination thereof. In a particular embodiment, load manager 132 does not monitor system tasks that are running in operating environment 140, because the system processes that run on tablet processing system 150 will be different and the system processes that do run on the tablet processing system will be maintained on the tablet processing system.

TABLE 1

Resource Footprint Table

| Process Name | Average CPU Usage (C) | Average Memory Usage (M) | Resource Footprint (C × M) |
|---|---|---|---|
| Word | 12% | 6% | 0.0072 |
| Halo-3 | 75% | 54% | *0.4050 * |
| Excel | 10% | 24% | 0.0024 |
| System | 30% | 25% | 0.0750 |

When hybrid device 100 is placed into the migration undock mode, load manager 132 determines a set of processes to be migrated from dock processing system 110 to tablet processing system 150. In a particular embodiment, load manager 132 determines the set of processes by comparing a total footprint of the processes, a sum of the resource footprints, against a tablet footprint, an amount of resources available to be utilized by tablet processing system 150. In particular, if the total footprint is less than the tablet footprint, then all of the processes can be migrated from dock processing system 110 to tablet processing system 150, and the tablet processing system will have adequate resources to run the processes. However, if the total footprint is greater than the tablet footprint, load manager 132 makes a decision as to which processes should be migrated, and which should not be migrated. In a particular embodiment, load manager 132 can include a prioritized listing of processes in order to make the decision. In another embodiment, load manager 132 relies on a user interface to receive input from a user as to which processes should be migrated. For example, in Table 1, the process named Halo-3 can be identified as utilizing too many resources to be successfully migrated to tablet processing system 150 and can be flagged as such, for example by the fact that the resource footprint is highlighted or otherwise marked.

A list of processes is provided by load manager 132 to migration manager 130, and the migration manager determines a machine state for processor 112 and operating environment 140 that is needed to be loaded to tablet processing system 150 in order to launch the list of processes on the tablet processing system. For example, migration manager 130 can collect a snapshot of the state of processor 112 and of operating environment 140 via one or more known migration mechanisms, such as via a VM-ware V-Motion application or other such similar migration mechanism. Migration manager 130 also provides a data image 392 to partition manager 124 for transfer to partition manager 164 and storage on storage device 154. In this way, data associated with a current state of operating environment 140 is provided to tablet processing system 150. In a particular embodiment, migration image 390 and data image 392 are provided as a single image file that is transferred to tablet processing system. In a particular embodiment, a user can pre-select one or more application or activity, such that data or state changes associated with the pre-selected application or activity are mirrored on storage device 114 and on storage device 154. In this way, some or all of data image 392 can already be stored on storage device 154 when hybrid device 100 is placed into the migration undock mode, so as to speed up the migration process. Finally, when migration image 390 and data image 392 are transferred to tablet processing system 150, dock processing system 110 and operating environment 140 are shut down or otherwise suspended, as needed or desired.

While migration manager 130 creates migration image 390 and data image 392, tablet processing system 150 performs the POST process to load HAL 282 and passes machine execution to para-virtualization layer 284, and the para-virtualization layer launches OS 386. However, the launch of OS 386 is not finalized until migration image 390 and data image 392 are loaded to the tablet processing system. When loading of migration image 390 and data image 392 is done, migration manager 170 operates to provide the machine state information to processor 152, to launch the processes included in the list of processes from load manager 132, and to provide the data from data image 392 to the launched applications. Partition manager 164 sets up a temporary partition 356, such that, as tablet processing system 150 makes changes to any data received in data image 392, the changes are stored in the temporary partition for easy re-migration back to dock processing system 110 when the tablet processing system is re-connected to the dock processing system, as described below. At this point, a user interface is provided to inform the user that the migration is complete, and that tablet processing system 150 can be disconnected from dock processing system 110. The skilled artisan will recognize that passing of both migration image 390 and data image 392 are performed via connection interfaces 122 and 162, and that both the migration image and the data image will initially be written to one or more storage device 154 and temporary partition 356 for use by migration manager 170 and partition manager 164 in completing the migration undock mode event.

When tablet processing system 150 is reconnected to dock processing system 110, a reverse migration process is initiated to restore hybrid device 100 to the docked mode. Here, migration manager 170 determines the list of processes that are running on tablet processing system 150 and a machine state for processor 152 and operating environment 380 that is needed to be loaded to dock processing system 110 in order to launch the list of processes on the dock processing system, and provides a remigration image similar to migration image 390 to be loaded to the dock processing system. Also, migration manager 170 provides a data image similar to data image 392 to partition manager 164 for transfer to partition manager 124 and storage on storage device 114. While migration manager 170 is creating the remigration image and the data image, dock processing system 110 and operating environment 140 are rebooted or otherwise resumed from the suspend state in preparation for receiving the remigration image and the data image. When dock processing system 110 receives the remigration image and the data image, operation is resumed in the docked mode, as described above. In a particular embodiment, when tablet processing system 150 is operating in the docked mode after a remigration, partition manager 164 deletes temporary partition 356. In another embodiment, partition manager 164 maintains temporary partition 356 for future migration undock mode events.

Figure 4:
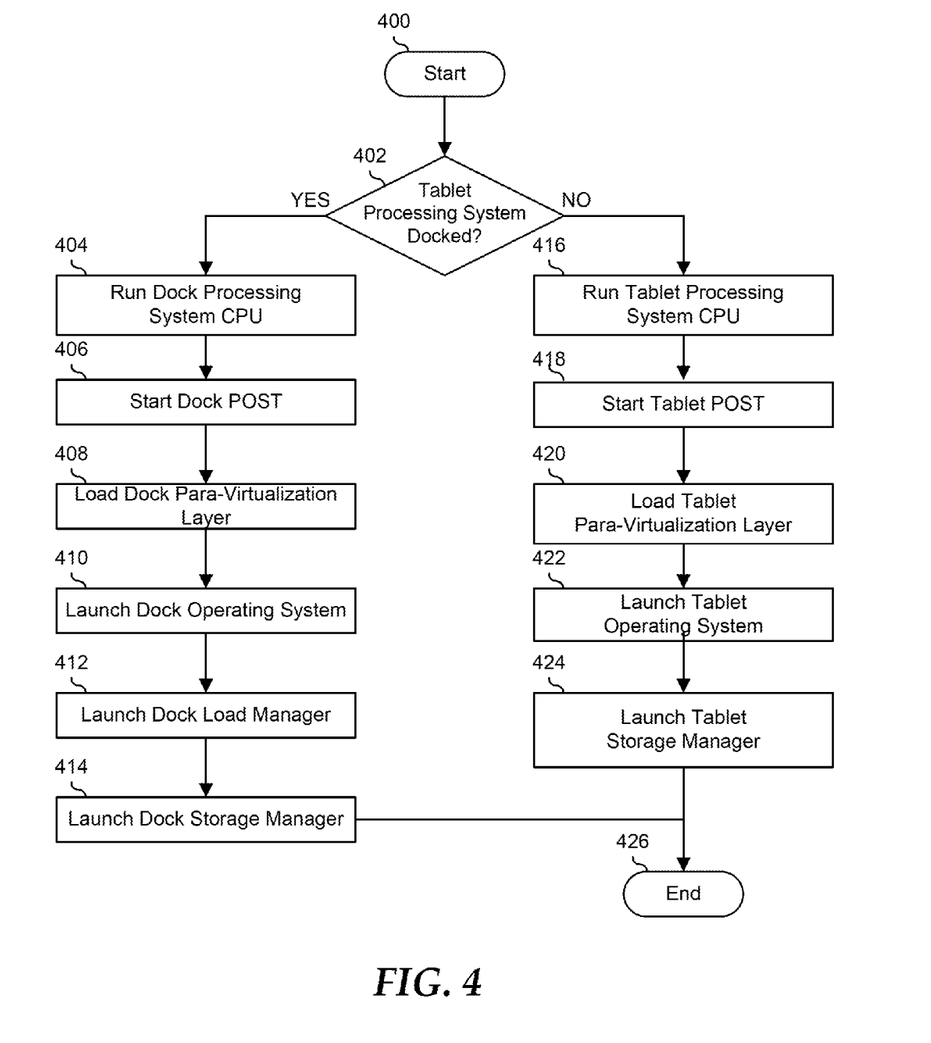
FIG. 4 is a flowchart illustrating a method for booting a hybrid device according to an embodiment of the present disclosure.

FIG. 4 illustrates a method for booting a hybrid device such as hybrid device 100, starting at block 400. A decision is made as to whether or not a tablet processing system is docked in decision block 402. For example, one or more of dock detectors 118 and 158 can determine if tablet processing system 150 is docked with dock processing system 110. If so, the "YES" branch of decision block 402 is taken and the dock processing system CPU is run in block 404. For example, processor 112 can be set to begin executing a boot process. The dock is set to initiate a POST in block 406 and the dock para-virtualization layer is launched in block 408. The para-virtualization layer launches the operating system in block 410, launches the load manager in block 412, launches the storage manager in block 414, and the method ends in block 426.

If the tablet processing system is not docked, the "NO" branch of decision block 402 is taken and the tablet processing system CPU is run in block 416. For example, processor 152 can be set to begin executing a boot process. The tablet is set to initiate a POST in block 418 and the tablet para-virtualization layer is launched in block 420. The para-virtualization layer launches the operating system in block 422, launches the storage manager in block 424, and the method ends in block 426.

Figure 5:
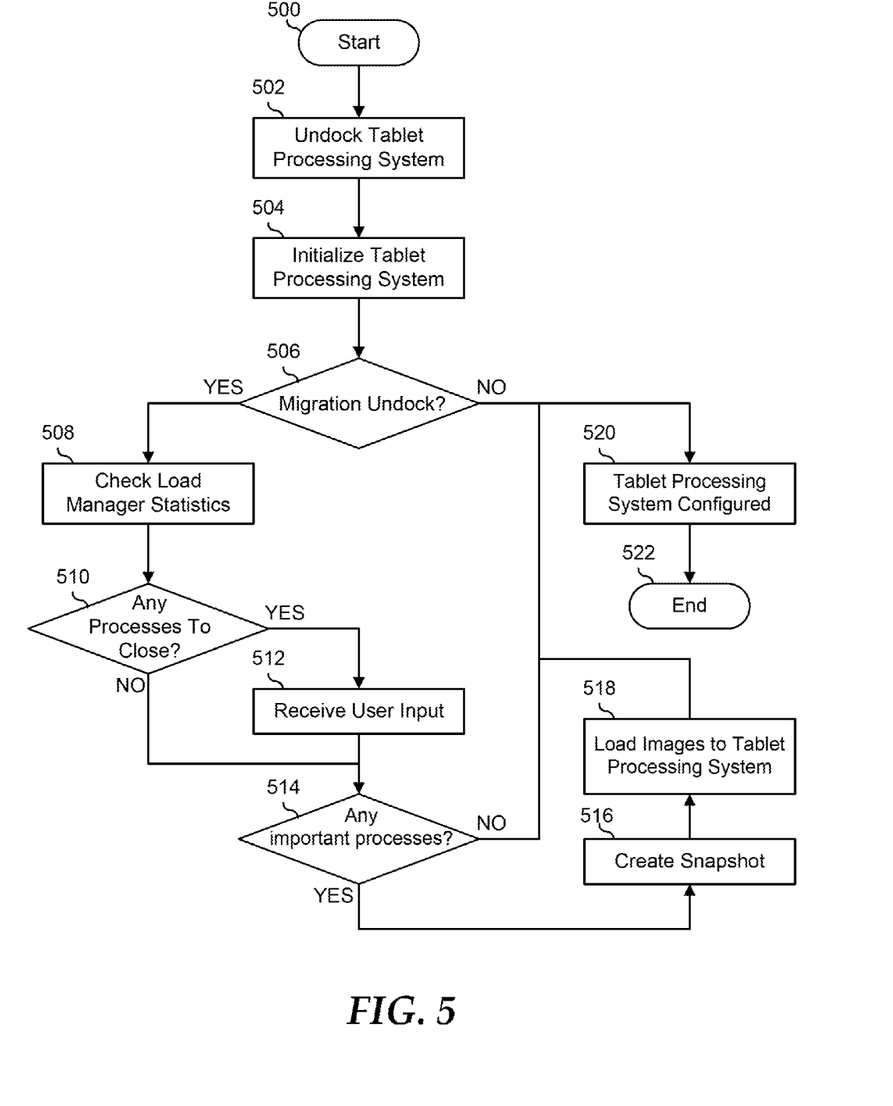
FIG. 5 is a flowchart illustrating a method for transferring an active state between a powerful processor and a less powerful processor according to an embodiment of the present disclosure.

FIG. 5 illustrates a method for transferring an active state between a powerful processor and a less powerful processor, starting at block 500. For example, an active state from dock processing device 110 can be transferred to tablet processing system 150. A tablet processing system is undocked from a dock processing system in block 502. For example, one or more of dock detectors 118 and 158 can determine that tablet processing system 150 has undocked from dock processing system 110. The tablet processing system is initialized in block 504. For example, the tablet processing system can be initialized in accordance with the method of FIG. 4. A decision is made as to whether or not the undocking is a migration undock mode event in decision block 506. If not, the "NO" branch of decision block 506 is taken, the tablet processing system is configured in block 520, and the method ends in block 522. For example, para-virtualization layer 284 can launch OS 386 and application 388. If A the undocking is a migration undock mode event, the "YES" branch of decision block 506 is taken, and a load manager in a dock processing system checks the process statistics in block 508. For example, load manager 132 can check a resource footprint table similar to Table 1, above. A decision is made as to whether or not any of the processes running on the dock processing system are determined by the load manager to be closed in decision block 510. If so, the "YES" branch of decision block 510 is taken, and a user's input is received as to which process is to be closed in block 512 and the method continues at decision block 514. Also, if none of the processes running on the dock processing system are determined by the load manager to be closed, the "NO" branch of block 510 is taken an the method proceeds to decision block 514, where a decision is made as to whether or not any important processes are running on the dock processing system.

If not, the "NO" branch of decision block 514 is taken, the tablet processing system is configured in block 520, and the method ends in block 522. If any important processes are running on the dock processing system, the "YES" branch of decision block 514 is taken and a snapshot of the machine state of the dock processing system is taken in block 516. The snapshot can include one or more of migration image 390 and data image 392. The snapshot image is loaded to the tablet processing system in block 518, the tablet processing system is configured in block 520, and the method ends in block 522

Figure 6:
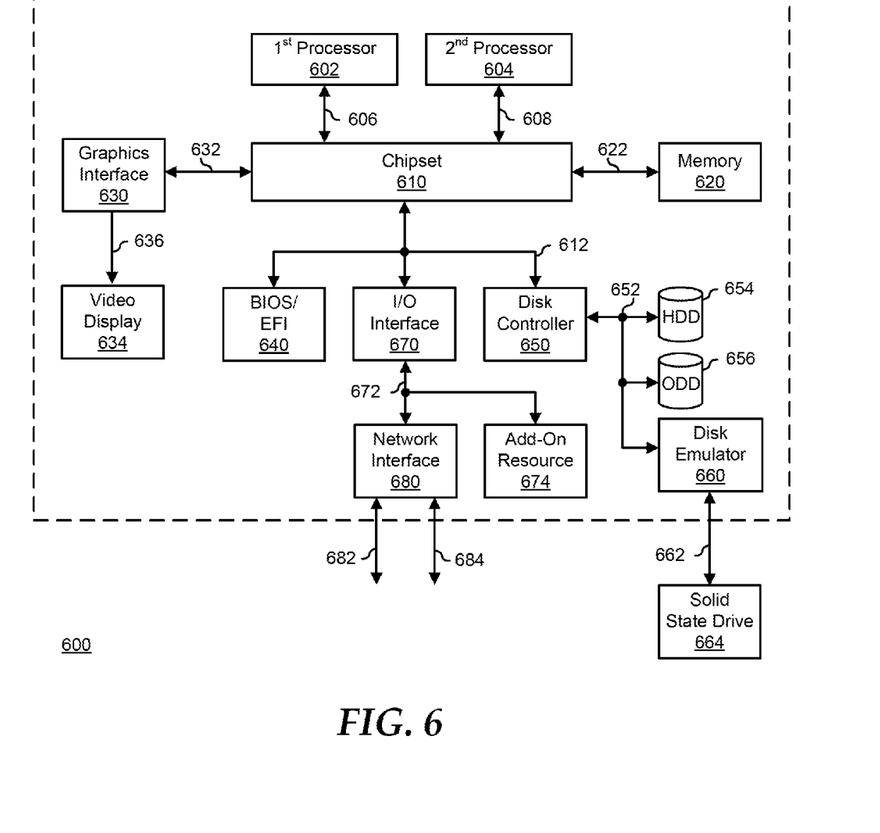
FIG. 6 is a block diagram illustrating a generalized information handling system according to an embodiment of the present disclosure.

FIG. 6 illustrates a generalized embodiment of information handling system 600. For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described above, and operates to perform one or more of the methods described above. Information handling system 600 includes a processors 602 and 604, a chipset 610, a memory 620, a graphics interface 630, include a basic input and output system/extensible firmware interface (BIOS/EFI) module 640, a disk controller 650, a disk emulator 660, an input/output (I/O) interface 670, and a network interface 680. Processor 602 is connected to chipset 610 via processor interface 606, and processor 604 is connected to the chipset via processor interface 608. Memory 620 is connected to chipset 610 via a memory bus 622. Graphics interface 630 is connected to chipset 610 via a graphics interface 632, and provides a video display output 636 to a video display 634. In a particular embodiment, information handling system 600 includes separate memories that are dedicated to each of processors 602 and 604 via separate memory interfaces. An example of memory 620 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 640, disk controller 650, and I/O interface 670 are connected to chipset 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 640 includes BIOS/EFI code operable to detect resources within information handling system 600, to provide drivers for the resources, initialize the resources, and access the resources. BIOS/EFI module 640 includes code that operates to detect resources within information handling system 600, to provide drivers for the resources, to initialize the resources, and to access the resources.

Disk controller 650 includes a disk interface 652 that connects the disc controller to a hard disk drive (HDD) 654, to an optical disk drive (ODD) 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits a solid-state drive 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O interface 670 includes a peripheral interface 672 that connects the I/O interface to an add-on resource 674 and to network interface 680. Peripheral interface 672 can be the same type of interface as I/O channel 612, or can be a different type of interface. As such, I/O interface 670 extends the capacity of I/O channel 612 when peripheral interface 672 and the I/O channel are of the same type, and the I/O interface translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as chipset 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a tablet processing system including a first processor; and
    a dock processing system including a second processor that:
        determines that the tablet processing system is coupled to the dock processing system;
        receives a request for the tablet processing system to be uncoupled from the dock processing system;
        creates a migration image in response to receiving the request; and
        sends the migration image to the tablet processing system;
    wherein the first processor:
        boots the tablet processing system in response to receiving the request, wherein in booting the tablet processing system, the first processor performs a power on self test; and
        loads the migration image from the second processor.

2. The information handling system of claim 1, wherein the dock processing system further includes a load manager that identifies a first process running on the dock processing system.

3. The information handling system of claim 2, wherein the load manager identifies the first process in response to receiving the request.

4. The information handling system of claim 3, wherein the load manager:
    tracks a plurality of processes running on the dock processing system prior to receiving the request;
    determines a resource footprint for each process of the plurality of processes; and
    identifies the first process based upon a first resource footprint of the first process.

5. The information handling system of claim 4, wherein in identifying the first process based upon a first resource footprint of the first process, the load manager further:
    compares the first resource footprint to a tablet footprint; and
    identifies the first process when the first process footprint is less than the tablet footprint.

6. The information handling system of claim 2, the wherein dock processing system further includes a first migration manager that:
    identifies state information of the dock processing system;
    receives the identity of the first process from the load manager;
    creates the migration image to include the identity of the first process and the state information; and
    sends the migration image to the tablet processing system.

7. The information handling system of claim 1, wherein:
    the second processor further:
        creates a data image in response to receiving the request, wherein the data image comprises data associated with a process; and
        sends the data image to the tablet processing system; the tablet processing system further includes a first storage device; and
    the first processor further:
        stores the data image at the first storage device; and
        provides the data to an application in the tablet processing system.

8. The information handling system of claim 1, wherein the first processor further provides an indication that a migration to the tablet processing system is complete and that the tablet processing system can be uncoupled from the dock processing system in response to launching a first process.

9. A method comprising:
    determining, by a first processor of a dock processing system, that a tablet processing system is coupled to the dock processing system;
    receiving, by the first processor, a request for the tablet processing system to be uncoupled from the dock processing system;
    creating, by the first processor, a migration image in response to receiving the request;
    sending the migration image to the tablet processing system;
    receiving, by a second processor of the tablet processing system, the request;
    booting the tablet processing system in response to receiving the request, wherein booting the tablet includes performing a power on self test;
    receiving, by the second processor, the migration image from the first processor; and
    loading, by the second processor, the migration image to the tablet processing system.

10. The method of claim 9, wherein, in creating the migration image, the method further comprises:
    identifying, by a load manager of the dock processing system, a first process.

11. The method of claim 10, wherein identifying the first process is in response to receiving the request.

12. The method of claim 11, further comprising:
    tracking, by the load manager, a plurality of processes running on the dock processing system prior to receiving the request;
    determining, by the load manager, a resource footprint for each process of the plurality of processes; and identifying, by the load manager, the first process based upon a first resource footprint of the first process.

13. The method of claim 12, wherein in identifying the first process based upon a first resource footprint of the first process, the method further comprises:
comparing, by the load manager, the first resource footprint to a tablet footprint; and
identifying, by the load manager, the first process when the first process footprint is less than the tablet footprint.

14. The method of claim 10, the further comprising:
identifying, by a migration manager of the dock processing system, state information for the dock processing system; and
receiving, by the migration manager, the identity of the first process from the load manager;
wherein creating the migration image and sending the migration image to the tablet processing system are by the migration manager.

15. The method of claim 9, wherein:
creating, by the first processor, a data image in response to receiving the request, wherein the data image comprises data associated with a process; and
sending, by the first processor, the data image to the tablet processing system;
storing, by the second processor, the data image at a first storage device of the tablet processing system; and
providing, by the second processor, the data to an application in the tablet processing system.

16. The method of claim 9, further comprising: providing, by the second processor, an indication that a migration to the tablet processing system is complete and that the tablet processing can be uncoupled from the dock processing system in response to launching a first process.

17. A non-transitory computer readable medium including code for performing a method, the method comprising:
determining, by a first processor of a dock processing system, that a tablet processing system is coupled to the dock processing system;
receiving, by the first processor, a request for the tablet processing system to be uncoupled from the dock processing system;
creating a migration image in response to receiving the request;
sending the migration image to the tablet processing system;
receiving, by a second processor of the tablet processing system, the request;
booting the tablet processing system in response to receiving the request, wherein booting the tablet includes performing a power on self test;
receiving, by the second processor, the migration image from the first processor; and
loading the migration image to the tablet processing system.

18. The computer-readable medium of claim 17, wherein, in creating the migration image, the method further comprises:
identifying, by a load manager of the dock processing system, a first process.

19. The computer-readable medium of claim 17, the method further comprising:
creating, by the first processor, a data image in response to receiving the request, wherein the data image comprises data associated with a process; and
sending, by the first processor, the data image to the tablet processing system;
storing, by the second processor, the data image at a first storage device of the tablet processing system; and
providing, by the second processor, the data to an application in the tablet processing system.

20. The computer-readable medium of claim 17, the method further comprising: providing, by the second processor, an indication that a migration to the tablet processing system is complete and that the tablet processing can be uncoupled from the dock processing system in response to launching a first process.

* * * * *